(Model.)
E. BRODHAG.
PICTURE FRAME.
No. 261,132.                           Patented July 18, 1882.
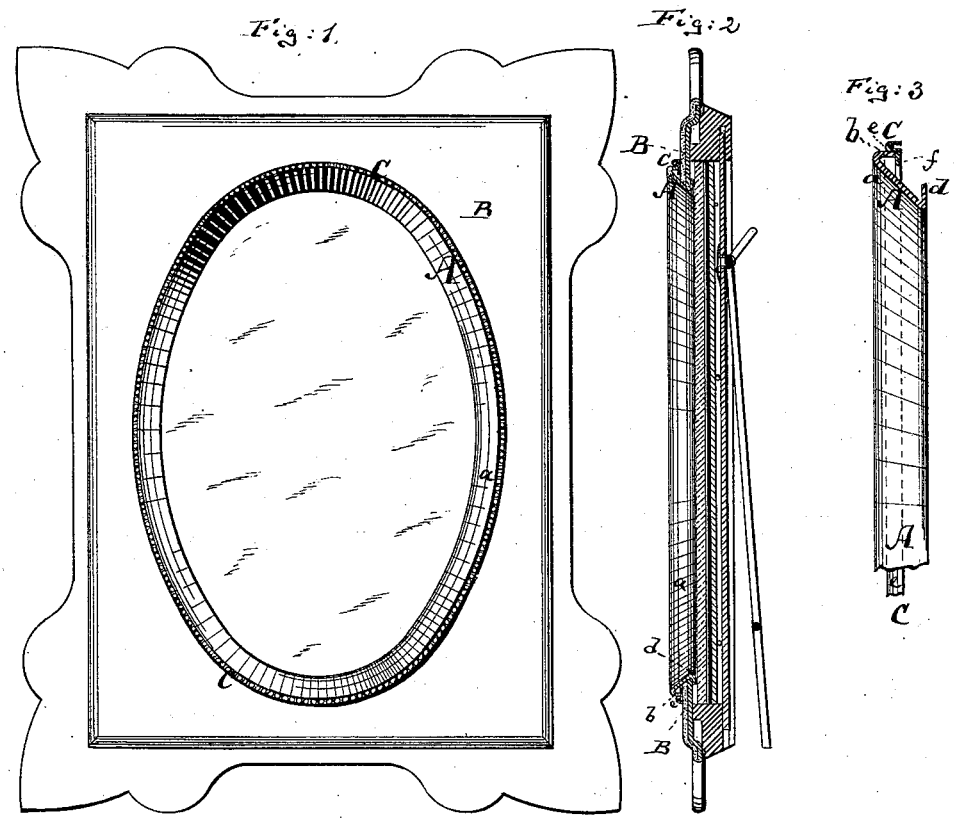
Witnesses
John C. Tunbridge
John M. Speer
Inventor:
Edward Brodhag
by his attorneys
Briesen & Betts

UNITED STATES PATENT OFFICE.

EDUARD BRODHAG, OF JERSEY CITY, NEW JERSEY, ASSIGNOR TO LEWIS PATTBERG & BROS., OF NEW YORK, N. Y.

PICTURE-FRAME.

SPECIFICATION forming part of Letters Patent No. 261,132, dated July 18, 1882.

Application filed June 9, 1882. (Model.)

*To all whom it may concern:*

Be it known that I, EDUARD BRODHAG, of Jersey City, in the county of Hudson and State of New Jersey, have invented an Improvement in Picture-Frames, of which the following is a specification.

Figure 1 is a face view of the improved picture-frame; Fig. 2, a vertical central section of the same, and Fig. 3 a detail sectional view of the same on an enlarged scale.

This invention has for its object to add to the efficiency in effect of the picture-frame which is described and shown in Letters Patent No. 195,530, dated September 25, 1877. In the frame described in that patent the sheet-metal molding had an inner flat ring that lapped behind the body of the frame, an oblique middle portion, and an outwardly-projecting rim which laid against the outer face of the body. Frames of that construction have gone into extensive use because of their simplicity of structure and beauty of appearance. It is my desire to still further improve them by the production of a molding consisting of series of rings of different metals or substances, or of the same metal treated in different ways, so as thus to enhance the effect of the entire frame.

My invention consists in combining with the molding, substantially like that described in said Letters Patent No. 195,530, an outer molding or moldings placed against the face of the body of the frame and held in position by the pressure of the outwardly-projecting rim of the main molding and without soldering.

In the drawings, the letter A represents the sheet-metal molding or lining similar to that described in said Patent No. 195,530.

B is the body of the picture-frame. The molding A has the oblique middle portion, $a$, a backwardly-projecting rim, $b$, and an inwardly-projecting ring, $d$, all substantially as described in said patent.

C is another molding or ring, ornamented at its exposed portion $e$ in suitable manner, and of such shape and size as to embrace or surround the molding A. A flat inner part, $f$, of the ring C extends behind the backwardly-projecting rim $b$ of the molding A, as clearly shown in Fig. 3, and is thus held in position— that is to say, inasmuch as the molding A is firmly held in position by the inner ring, $d$, that fits behind the body B, it will in turn hold in place, by means of its outer rim, $b$, the ring C, and this in turn may hold in place another outer ring, &c. By this means I am enabled to produce a metallic molding on a picture-frame, which molding is composed of series of different metals or of differently colored or treated metals, and hold them all in place by the single inner ring, $d$, and without requiring the several moldings to be soldered together.

The ring or molding C may, if desired, be made of other substance than metal, and may be of the width substantially indicated in Fig. 3, or of any other suitable size.

I do not claim the molding A, nor its combination with the frame B; but

I do claim—

The combination of the molding A, having inner ring, $d$, and outer rim, $b$, with the molding C, having exposed part $e$ and inner part, $f$, and with the body B of the picture-frame, all arranged so that the molding C is held in place by the rim $b$ of the molding A, substantially as described.

EDUARD BRODHAG.

Witnesses:
WILLY G. E. SCHULTZ,
WILLIAM H. C. SMITH.